United States Patent
Blenis et al.

(10) Patent No.: US 6,247,053 B1
(45) Date of Patent: Jun. 12, 2001

(54) METHOD AND APPARATUS FOR PROVIDING MONITORING CAPABILITY

(75) Inventors: James Blenis; Peter S. Cornell, both of Conyers, GA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/133,652

(22) Filed: Aug. 13, 1998

(51) Int. Cl.[7] ................................................. G06F 15/173
(52) U.S. Cl. .......................................................... 709/224
(58) Field of Search .................................... 709/220, 221, 709/224, 246, 230

(56) References Cited

U.S. PATENT DOCUMENTS

| | | | |
|---|---|---|---|
| 5,289,468 | * 2/1994 | Yoshida | 370/401 |
| 5,568,402 | * 10/1996 | Gray et al. | 709/224 |
| 5,784,558 | * 7/1998 | Emerson et al. | 709/230 |
| 5,845,081 | * 12/1998 | Rangarajan et al. | 709/224 |
| 5,991,806 | * 11/1999 | McHann, Jr. | 709/224 |
| 6,011,803 | * 1/2000 | Bicknell et al. | 370/467 |

* cited by examiner

Primary Examiner—Moustafa M. Meky
Assistant Examiner—Nkosi N Trim
(74) Attorney, Agent, or Firm—Robert B. Levy

(57) ABSTRACT

To overcome the incompatibility between network-generated and customer premises equipment-generated monitoring signals, a translator device (26) intercepts and strips off a network-generated monitoring signal received from the network (10) on a communication channel (12). In place of the network-generated monitoring signal, the translator provides a first alternate monitoring signal derived (translated) from the network-generated monitoring signal but of a format compatible with the customer premises equipment. The translator device also intercepts the customer premises equipment-generated monitoring signal and substitutes a second alternate monitoring signal derived (translated) from the customer premises equipment-generated monitoring signal but of a format compatible with the network.

5 Claims, 1 Drawing Sheet

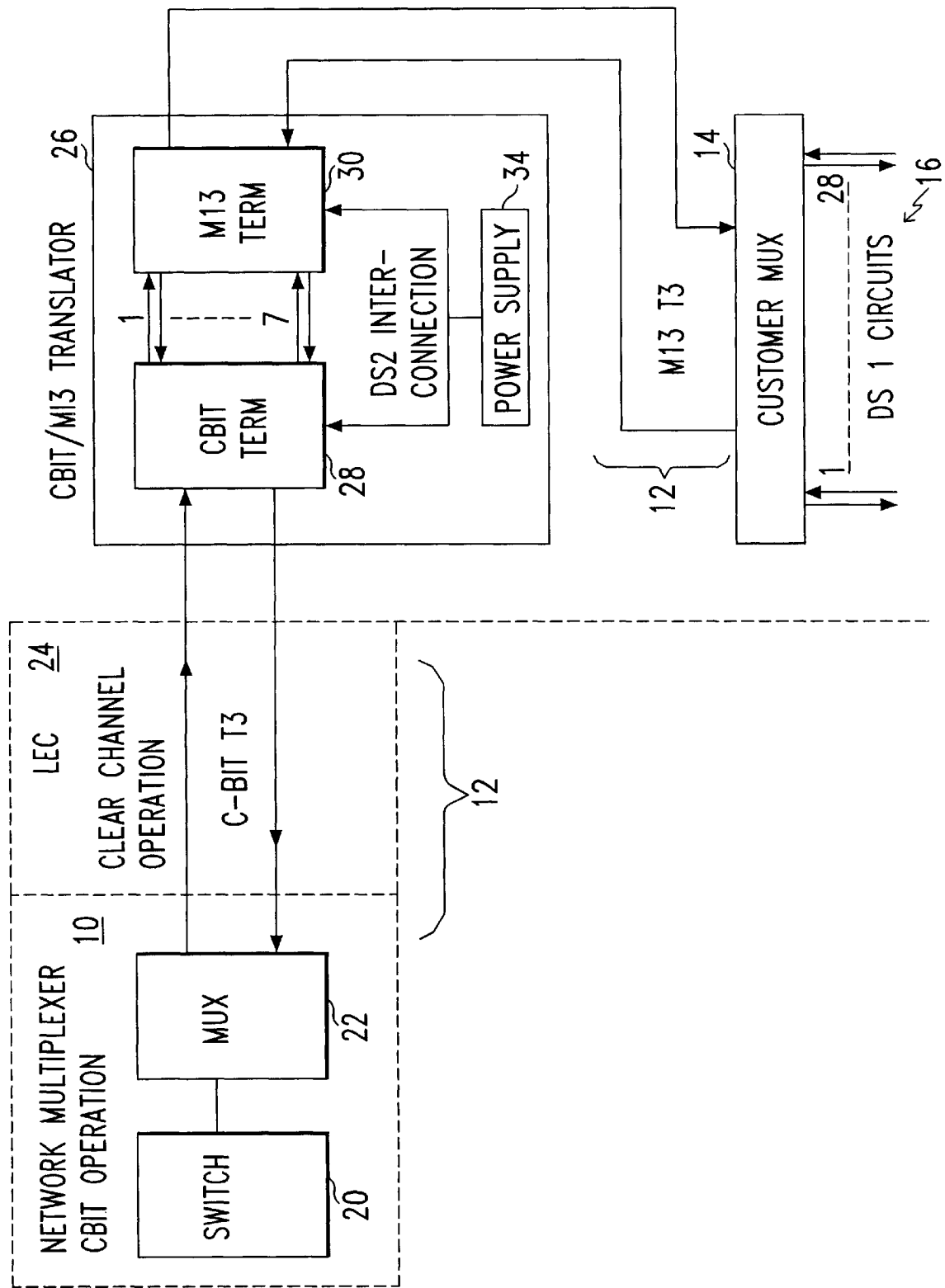

METHOD AND APPARATUS FOR PROVIDING MONITORING CAPABILITY

TECHNICAL FIELD

This invention relates to a technique for extending the capability of a telecommunications network to monitor traffic beyond the network.

BACKGROUND ART

Many Inter-exchange Carriers (IXCs) provide their large customers with direct access through high-speed trunks, typically T1 or T3 trunks. Some IXCs, such as AT&T monitor the status of such direct access high-speed trunks within their own networks to detect and isolate troubles in an effort to avoid service outages. For example, within AT&T's network, certain types of equipment, such as the DDM 1000 multiplexer, available from Lucent Technologies, have the capability of detecting parity errors in the transmit direction on a T3 trunk and in response, generating a signal indicative of such errors in a C-bit data stream carried over the reverse path (the receive channel) of the monitored T3 trunk. By monitoring the transmitted traffic, AT&T can readily detect potential difficulties, and take appropriate action, thereby greatly reducing the incidence of path failures.

Presently, the ability of an IXC carrier to monitor the transmitted traffic beyond its own network, and particularly, to monitor such traffic at a customer premises, depends on the presence at the customer premises of equipment capable of returning a C-bit signal on a reverse path. In practice, not all customers that enjoy direct access through a high-speed trunk possess equipment capable of generating a C-bit monitoring signal, making monitoring of traffic at the customer premises impossible.

Thus, there is a need for a technique for extending the monitoring capability of an IXC to facilitate monitoring of traffic at a customer premises.

BRIEF SUMMARY OF THE INVENTION

Briefly, the present invention provides a technique for extending the capability of a network to monitor traffic on a communications channel that extends beyond the network to a customer premises. In accordance with the invention, the network transmits a traffic performance-indicative first monitoring signal of a first format (e.g., C-Bit T3 ) that is ultimately destined for the customer premises equipment. The customer premises equipment also generates a traffic performance-indicative monitoring signal of a format (e.g., M13) compatible with the customer premises equipment that is ultimately destined for the network. To overcome the incompatibility between the network and customer premises equipment monitoring signals, a translator device intercepts and strips from the communication channel the first monitoring signal. In its place, the translator device substitutes a first alternate monitoring signal derived from the first monitoring signal but of a format compatible with the customer premises equipment. The translator device also intercepts the second monitoring signal and substitutes a second alternate monitoring signal derived from the second monitoring signal but of a format compatible with the network. Thus, the network and customer premises equipment receive monitoring signals of a compatible format. In this way, the network can monitor traffic at customer premises equipment lying beyond the network.

BRIEF DESCRIPTION OF THE DRAWING

FIG. 1 illustrates a block schematic drawing of a network having extended monitoring capability for monitoring equipment at a customer premises in accordance with the invention.

DETAILED DESCRIPTION

FIG. 1 depicts a telecommunications network 10 for communicating telecommunications traffic across a communication channel 12, such as a T3 channel, with equipment 14, such as a multiplexer, at a customer premises 16. In the illustrated. embodiment, the network 10 takes the form of an inter-exchange carrier telecommunications network such as that maintained by AT&T, and includes elements, such as a switch 20 and a multiplexer 22, the later typically comprising a model DDM 1000 manufactured by Lucent Technologies.

The communications channel 12 carrying traffic between the network 10 and the customer premises-based multiplexer 14 typically extends beyond the network itself. In the illustrated embodiment, at least a portion of the communication channel 12 extends through, and is maintained by a Local Exchange Carrier (LEC) 24 that provides connectivity between the customer premises 16 and the network 10. The portion of the channel 12 lying beyond the network 10 is generally outside the control of the system (not shown) that manage the network 10. Thus, network 10 must depend on the LEC 24 for any detecting and isolating any troubles on that portion of the channel extending through the LEC.

To assure high quality service and customer satisfaction, network 10 typically includes one or more mechanisms for monitoring the traffic on at least that portion of the communications channel 12 lying within the network. In the preferred embodiment, the multiplexer 22 typically comprises a model DDM 1000 multiplexer, manufactured by Lucent Technologies, which as discussed above, has the capability of detecting parity errors in the transmit direction on a T3 trunk and providing information indicative of such errors in a C-bit-framed data stream carried over the reverse path. However, not all pieces of equipment along the communications channel, such multiplexer 14 at the customer premises 16 generate compatible monitoring signals. Indeed, many pieces of equipment, such as the customer premises-based multiplexer 14, may generate an M13-framed monitoring signal indicative of monitored traffic. Such M13-framed monitoring signals have a format that is incompatible with the C-bit monitoring signal generated by the multiplexer 22. The lack of compatibility of monitoring signals has heretofore precluded the network 10 from extending its monitoring ability to the customer premises.

To overcome this difficulty, the present invention provides a monitoring signal translator 26 interposed on the communications channel 12 between the network 10 and the customer premises-based multiplexer 14 for translating the monitoring signal (e.g., the C-bit-framed signal) provided by the network into a signal (e.g., a M13-framed signal) compatible with such equipment and vice versa. The translator 26 of the invention comprises a model AKM 2 interface card, available from Lucent Technologies, and includes a C-bit terminal 28 and a M13 bit terminal 30 coupled to each other, and each powered by a power supply 34. The C-Bit terminal 28 receives a DS-3 level signal carried on the communications channel 12 from the network 10 and serves to intercept and strip off the C-bit-framed monitoring signal. In its place the, the C-bit terminal 28 substitutes an M13-framed monitoring signal, indicative of the performance of the transmitted traffic. The M13-framed monitoring signal generated by the C-bit terminal 28 is thus compatible with the customer premises-based multiplexer 14.

The M13-bit terminal 30 operates analogously to the C-bit terminal 28. In particular, the M13-Bit terminal 30 receives the DS-3 level signal carried on the communications channel 12 from the customer premises-based multiplexer and serves to intercept and strip off the M13-bit monitoring signal. In its place the, the M13-bit terminal 30 substitutes a C-bit-framed monitoring signal, indicative of the performance of the transmitted traffic. The C-bit-framed monitoring signal is thus compatible with the network 10.

As may be appreciated, the translator 26 affords the network 10 the capability to extend a monitoring capability to the customer premises 16. By intercepting and stripping off the C-Bit and M13 monitoring signals received from the network 10 and the customer premises-based multiplexer 14, respectively, and by substituting M13-bit framed and C-bit framed monitoring signals indicative of the performance of the network traffic and customer premises-based multiplexer traffic, respectively, the translator 26 thus allows the network 10 the ability to monitor the performance of the traffic at the customer premises-based equipment.

The above-described embodiments merely illustrate the principles of the invention. Those skilled in the art may make various modifications and changes that will embody the principles of the invention and fall within the spirit and scope thereof.

What is claimed is:

1. A method for extending the monitoring capability of a network to monitor the transmission of traffic on a communication channel from the network for receipt at equipment at a customer premises lying beyond the network, comprising the steps of:

transmitting from the network a first monitoring signal indicative of network traffic on the communications channel, said first monitoring signal of a format compatible with the network and destined for the equipment at the customer premises;

transmitting from the equipment at the customer premises a second monitoring signal indicative of customer premises traffic on the communications channel, said second monitoring signal of a format compatible with the customer premises equipment and destined for the network;

intercepting and stripping off at a translator device coupled between the network and the customer premises equipment the first monitoring signal and translating said first monitoring signal into a first alternate monitoring signal of a format compatible with the customer premises equipment for transmission thereto; and intercepting and stripping off at the translator device the second monitoring signal and translating the second monitoring signal into a second alternate monitoring signal of a format compatible with the network.

2. The method according to claim 1 wherein the network transmits a C-bit framed monitoring signal.

3. The method according to claim 2 wherein the customer-premises equipment generates a M13-bit framed monitoring signal.

4. The method according to claim 3 wherein the translator translates the first and second monitoring signals into the first and second alternative monitoring signals which are of a M13 and C-bit framed format, respectively.

5. In combination with a first network that monitors the transmission of traffic on a communication channel from the network for receipt at equipment at a customer premises lying beyond the network, comprising:

means in said network for transmitting a first monitoring signal to the equipment at the customer premises indicative of network traffic on the communications channel, said first monitoring signal of a format compatible with the network and destined for the equipment at the customer premises;

means at the customer premises for transmitting a second monitoring signal to the network indicative of customer premises traffic on the communications channel, said second monitoring signal of a format compatible with the customer premises equipment and destined for the network;

means coupled between the network and the customer premises equipment for intercepting and stripping off the first monitoring signal and translating said first monitoring signal into a first alternate monitoring signal of a format compatible with the customer premises equipment for transmission thereto and for intercepting and stripping off the second monitoring signal and translating the second monitoring signal into a second alternate monitoring signal of a format compatible with the network.

\* \* \* \* \*